UNITED STATES PATENT OFFICE.

WILLIAM B. FERGUSON, OF ROCHESTER, NEW YORK.

REMEDY FOR SKIN DISEASES.

SPECIFICATION forming part of Letters Patent No. 338,725, dated March 30, 1886.

Application filed December 26, 1885. Serial No. 186,757. (No specimens.)

*To all whom it may concern:*

Be it known that I, WILLIAM B. FERGUSON, a subject of the Queen of England, residing at Rochester, in the county of Monroe and State of New York, have invented certain new and useful Improvements in Medical Compounds; and I do hereby declare that the following is a full, clear, and exact description of the invention, which will enable others skilled in the art to which it appertains to make and use the same.

The object of my invention is the production of a liquid or solid extract for the treatment or mitigation of all diseases of the skin; and it consists, essentially, of certain roots and herbs, compounded as hereinafter more particularly set forth.

In preparing my said invention I take about equal parts, by bulk, of thistle-root, cranberry-root, elderberry-root, wild turnip, leaves of the thorn-apple, and buds of the balm of Gilead. These six roots and herbs I preferably cut or grind into fine pieces by any suitable method; but the cutting or grinding is not essential, but serves to facilitate the preparation of the compound. They are then mixed together and placed in a suitable vessel and covered with alcohol, in which they are allowed to stand until the alcohol has thoroughly permeated the entire mass. To this mixture a sufficient amount of water is then added and the compound boiled down, the length of boiling being dependent upon the required strength of the solution.

It is practicable, and for some uses advisable, to boil the mixture down until the water has all evaporated, leaving the compound in the form of a salve. When the mixture has been boiled sufficiently, it is allowed to cool, and is then transferred to an ordinary wine-press or other suitable machine, through which it is passed, in order to complete the process of extracting from the herbs as much as possible of those properties therein contained which render my invention or discovery valuable for the purposes hereinbefore set forth.

I apply my said composition as follows: The part of the skin afflicted with any kind of cutaneous disease or eruption is rubbed with a rough cloth or other suitable article until it becomes red and heated by the friction. My said preparation is then rubbed on the parts affected.

This preparation I have found in practice to be a most effective remedy for cutaneous diseases and eruptions of the human skin.

Having described my invention, what I claim as new is—

The fluid or solid compound extract composed of thistle-root, cranberry-root, elderberry-root, wild turnip, leaves of the thorn-apple, and buds of the balm of Gilead, in the proportions described, or the purposes herein set forth.

In testimony whereof I have hereunto set my hand, this 15th day of December, 1885, in the presence of witnesses.

WILLIAM B. FERGUSON.

Witnesses:
PERLEY AINSWORTH,
E. S. ELLWANGER.